C. H. KICKLIGHTER.
METHOD OF ELECTRIC WELDING.
APPLICATION FILED JULY 28, 1919.

Patented Feb. 8, 1921.

INVENTOR
Chas. H. Kicklighter

UNITED STATES PATENT OFFICE.

CHARLES H. KICKLIGHTER, OF ATLANTA, GEORGIA.

METHOD OF ELECTRIC WELDING.

1,367,552.   Specification of Letters Patent.   Patented Feb. 8, 1921.

Application filed July 28, 1919. Serial No. 313,776.

*To all whom it may concern:*

Be it known that I, CHARLES H. KICKLIGHTER, a citizen of the United States, and a resident of Atlanta, in the county of Fulton and State of Georgia, have invented new and useful Improvements in Methods of Electric Welding, of which the following is a specification.

The invention relates to a method of joining two plates or pieces of metal by lapping the edges thereof and by welding the edge of each plate to the surface of the other by the application of pressure and heating electric current. The uniting of the plates along the edges thereof may be a direct fusion of the metal of the two plates or it may be through the medium of an intermediate metal strip to which both plates are fused The invention also relates to a seam between metal plates in which the edges of the plates are welded each to the surface of the other plate as above described. The invention moreover relates to metal work having its elements united by such seams and in the manner described.

The object of the invention is to afford an easy, simple and practical method of fastening metal plates or similar pieces of metal by the electric welding process. In the electric welding of heavy commercial stock, I have found that while it is often difficult to get a weld at a point removed from the edge of the plate by means of pressure and heavy welding current of low voltage as that from the transformer of a spot welding machine, I can obtain a good weld at the edge of a plate especially when a narrow strip or ribbon is used to further restrict the area of weld and path of the current. The difficulty in obtaining a weld at a point removed from the edge of a plate is apparent. The rigidity and stiffness of the plates prevent a concentration of the pressure and the limiting of the path of current to a restricted area of contact between the two plates. Both the pressure and the flow of current between the plates is distributed over a relatively large area of contact.

By applying the pressure at the edge of one of the plates there is less stiffness and as the edge is heated and yields under the pressure a sufficient concentration of flow of heating current between the plates can be obtained to effect a satisfactory weld. A continuous weld can be effected either by a step by step application of the terminals of a spot welding machine or by the application of heavy roller-contact welding-terminals.

I can concentrate the area of pressure to a greater extent, limit the path of heating current more and obtain a more effective weld by introducing an intermediate strip between the plates at the edge of one of the plates.

This method is considered quite an improvement in the art. A continuous weld may thus be made much more efficiently and in less time than can be accomplished in arc welding or gas welding. In both of these well known methods much time and expense are involved and expert workmen must be employed. In arc welding the dangerous high voltages must be handled.

Figure 1:
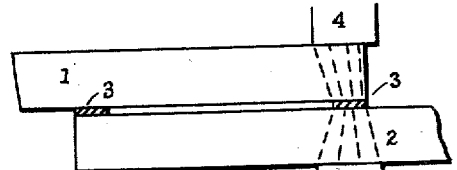
Figure 1 is a diagrammatic view, partially sectioned illustrating one application of the invention.
Figure 2:
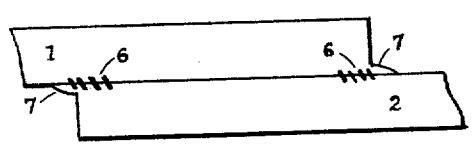
Fig. 2 illustrates the plates of Fig. 1 after the welding operation.

Referring to Figs. 1 and 2, the plates 1 and 2 are lapped, intermediate thin metal strips 3—3 are introduced between the plates at the edges thereof. By the application of welding terminals 4—5 the edges are subjected to pressure and heating electric current. These terminals may be those of an ordinary spot welding machine which it is not thought necessary herein to describe. The terminals are here shown flattened to afford a large area of contact.

As shown in Fig. 2 the strips are fused to both plates at 6—6, softened and partially squeezed from between the plates at 7—7 until the plates come into contact.

The metallic strips 3—3 serve to concentrate the pressure between the plates and limit the path of flow of heating current. During the fusion or immediately thereafter the softened metal may be squeezed from between the plates sufficiently to allow them to come into contact. The width of each strip 3—3 should be equal to one half the thickness of a plate or a little more to provide the proper strength.

Figure 3:
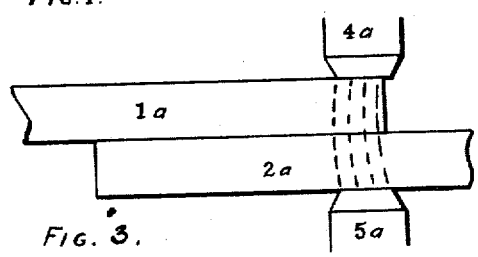
Fig. 3 illustrates a simplified application of the invention.
Figure 4:
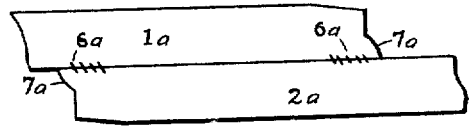
Fig. 4 illustrates the plates of Fig. 3 after the welding operation.

Referring to Figs. 3 and 4, a lap is formed by bringing plates 1ª and 2ª into contact face to face. By the application of welding terminals 4ª—5ª the parts are subjected to pressure and heating electric current. These terminals are applied oppositely first at the edge of one plate 1ª, and then at the edge of the other plate 2ª. The plates are fused at 6ª—6ª, just under the edge of each plate as shown in Fig. 4. The top edges of the plates are crushed down some and the metal forced out some at the bottom as at 7ª—7ª. It is preferable to make the welding terminals slightly self adjusting that they may conform to the yielding surface of the outer edges of the plates.

In the illustrations it is supposed that the terminals of a spot welding machine are applied in a step by step process. However it will be seen that heavy roller contacts may be used instead and may be found preferable in some cases.

The operation is apparent.

Plates 1 and 2 (or 1ª,) are brought into proper juxtaposition with intermediate strips or projections 3, which may be omitted as in Fig. 3. The assembled parts are subjected to pressure and electric heating current at the edge of one or more plates or metal pieces so as to concentrate the pressure and the heating current between the plates at a position where the stiffness of the plates will not interfere materially with their yielding. The plates are fused to each other or through the intermediate strips and the metal partially squeezed out till the plates come into contact.

What I claim is:

1. The method of fastening two metal plates together, face to face, which consists of overlapping their edges, with a narrow strip of metal between each edge and the juxtaposed surface of the other plate, and by the application of pressure and heating electric current of welding the assembled parts and of forcing the plates into immediate contact.

2. The method of fastening two metal plates together, face to face, which consists of overlapping their edges with a thin narrow strip of metal between the edge of one plate and the juxtaposed surface of the other plate, and by the application of pressure and heating electric current of welding the assembled parts so as to form a continuous seam.

3. The method of fastening two pieces of metal, face to face, which consists of overlapping their edges with a strip of metal between the extreme edge of one piece of metal and the juxtaposed surface of the other, and by the application of pressure and heating electric current of welding the assembled parts and of squeezing a sufficient part of the fused strip out so as to allow the pieces of metal to come into immediate contact.

4. A seam between two metal plates with overlapped edges, having two strips of metal therebetween, each strip being welded on one side to one plate under the extreme edge thereof and on the other side to the juxtaposed surface of the other plate.

5. A seam between two pieces of metal brought face to face with overlapping edges, and having a narrow strip of metal therebetween welded on one side to one piece under extreme edge thereof and on the other side to the juxtaposed surface of the other piece.

6. Composite metal work, having its elements united by a metallic strip located between the elements and welded on one side to one element under the extreme edge thereof and welded on the other side to the juxtaposed surface of the other element.

7. The method of fastening two pieces of metal together, which consists of overlapping their edges, and of uniting the pieces by two continuous parallel welds by the application of pressure and heating electric current so as to weld the surface at the extreme edge of each piece to the juxtaposed face of the other piece.

8. The method of fastening two metal plates together, face to face, which consists of overlapping their edges, and by the application of pressure and heating electric current of uniting them along their extreme edges in two continuous welds which are distinct and are separated by areas of unwelded contacting surfaces.

9. The method of fastening two pieces of metal together, which consists of bringing them into juxtaposition with overlapped edges, and of welding the surface in the immediate vicinity of the edge of one piece to the face of the other by concentrating mechanical pressure directly over and upon said edge where the plate is most flexible and by passing therethrough heating electric current.

10. The method of fastening two metal plates together, face to face, which consists of overlapping their edges and of welding the surface under the edge of each to the juxtaposed face of the other by the application of pressure and heating electric current directly upon said edges respectively, so as to concentrate the pressure between the plates to a narrow path and to restrict the passage of welding current to a limited area along the edges.

11. The method of fastening two pieces of metal together, which consists of bringing them into juxtaposition with overlapped edges, and of welding the surface under the edge of one to the face of the other by the application of pressure and heating electric current directly above and upon said edge so as to concentrate the pressure between the plates to a narrow path and to restrict the passage of the welding current to a
5 limited area along said edge.

In testimony whereof, I have hereunto signed my name in the presence of two subscribing witnesses at Atlanta in the county of Fulton and State of Georgia this 21 day of July, 1919.

CHARLES H. KICKLIGHTER.

Witnesses:
S. C. MORGAN,
K. C. MARKT.